United States Patent
Yokoyama et al.

(10) Patent No.: US 12,304,354 B2
(45) Date of Patent: May 20, 2025

(54) PLAN PREPARATION SYSTEM AND PLAN PREPARATION APPARATUS

(71) Applicant: TOYOTA JIDOSHA KABUSHIKI KAISHA, Toyota (JP)

(72) Inventors: Daiki Yokoyama, Gotemba (JP); Yoshihiro Sakayanagi, Mishima (JP); Midori Sugiyama, Susono (JP); Tomohiro Kaneko, Mishima (JP); Hirotaka Saito, Sunto-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 489 days.

(21) Appl. No.: 17/809,795

(22) Filed: Jun. 29, 2022

(65) Prior Publication Data

US 2023/0001825 A1    Jan. 5, 2023

(30) Foreign Application Priority Data

Jul. 5, 2021  (JP) .................................. 2021-111632

(51) Int. Cl.
| | |
|---|---|
| *B60L 58/27* | (2019.01) |
| *B60L 53/53* | (2019.01) |
| *B60L 58/13* | (2019.01) |
| *B60W 40/02* | (2006.01) |

(52) U.S. Cl.
CPC ............. *B60L 58/27* (2019.02); *B60L 53/53* (2019.02); *B60L 58/13* (2019.02); *B60W 40/02* (2013.01); *B60W 2555/20* (2020.02)

(58) Field of Classification Search
CPC .......... B60L 58/27; B60L 53/53; B60L 58/13; B60L 50/53; B60L 50/60; B60L 2240/545; B60L 2240/622; B60L 53/305; B60L 53/62; B60W 40/02; B60W 2555/20; Y02T 10/70; Y02T 10/7072
USPC ....................................................... 320/150
See application file for complete search history.

(56) References Cited

U.S. PATENT DOCUMENTS

| | | | | |
|---|---|---|---|---|
| 9,340,121 | B2 * | 5/2016 | Schwarz | B60L 50/61 |
| 9,358,896 | B2 * | 6/2016 | Nishita | G06Q 50/06 |
| 9,527,400 | B2 * | 12/2016 | Rhodes | B60L 15/2045 |
| 10,166,882 | B2 * | 1/2019 | Yang | B60L 53/00 |
| 10,218,206 | B2 * | 2/2019 | Lee | H02J 50/60 |

(Continued)

FOREIGN PATENT DOCUMENTS

| | | | | |
|---|---|---|---|---|
| JP | 2003219067 | A | * 7/2003 | ............ H04M 15/00 |
| JP | 2016-140193 | A | 8/2016 | |

*Primary Examiner* — M Baye Diao
(74) *Attorney, Agent, or Firm* — Finnegan, Henderson, Farabow, Garrett and Dunner LLP (57) ABSTRACT

A server prepares a charging plan for a travel route to a destination. The server obtains an outside air temperature and a battery temperature. The server reads a map from a storage, and calculates an amount of required heat required for increasing the battery temperature to a target temperature by collating the outside air temperature and the battery temperature with the map. The server prepares the charging plan such that an SOC of a battery at the time of arrival at the destination attains to a prescribed SOC and a sum of an amount of heat generation by charging of the battery at a charging point and an amount of heat generation by charging and discharging of the battery with travel of a vehicle is equal to the amount of required heat.

8 Claims, 6 Drawing Sheets

(56) References Cited

U.S. PATENT DOCUMENTS

| | | | |
|---|---|---|---|
| 11,745,621 B2* | 9/2023 | Youn | B60L 58/27 |
| | | | 320/132 |
| 2014/0361745 A1* | 12/2014 | Nishita | H02J 7/04 |
| | | | 320/109 |
| 2015/0380975 A1* | 12/2015 | Kanahara | H04L 67/12 |
| | | | 320/108 |
| 2018/0198313 A1* | 7/2018 | Lee | H02J 50/60 |

* cited by examiner

PLAN PREPARATION SYSTEM AND PLAN PREPARATION APPARATUS

This nonprovisional application is based on Japanese Patent Application No. 2021-111632 filed with the Japan Patent Office on Jul. 5, 2021, the entire contents of which are hereby incorporated by reference.

BACKGROUND

Field

The present disclosure relates to a plan preparation system and a plan preparation apparatus.

Description of the Background Art

Japanese Patent Laying-Open No. 2016-140193 discloses a vehicle in which a vehicle-mounted battery is chargeable through charging by a plurality of charging types (a plug-in charging type, a wireless charging type, and a solar charging type). This vehicle accepts input of programmed time and a set amount of charging from a user, and determines a charging plan using a plurality of charging types such that the amount of charging of a battery attains to the set amount of charging at the programmed time.

SUMMARY

In the vehicle according to Japanese Patent Laying-Open No. 2016-140193, the charging plan is determined in consideration only of electric power provided to the battery. Charging by the wireless charging type has been known to be lower in charging efficiency than the plug-in charging type. Lowering in this charging efficiency results in thermal energy. From a point of view of efficient use of energy, effective use of thermal energy and preparation of a charging plan including also thermal energy are desired.

The present disclosure was made to solve problems above, and an object of the present disclosure is to prepare a charging plan capable of achieving enhanced energy efficiency.

A plan preparation system according to one aspect of the present disclosure prepares a charging plan of a movable body in which a battery is chargeable by a plurality of charging types. The plurality of charging types include a wireless charging type. The movable body incorporates a subject device a target temperature of which has been determined. The plan preparation system includes a storage in which information is stored, the information defining relation between a parameter and an amount of required heat which is an amount of heat required for increasing a temperature of the subject device to the target temperature, and a controller that prepares the charging plan from a current location to a destination of the movable body. The controller obtains the parameter, calculates the amount of required heat by collating the obtained parameter with the information, and increases, when the amount of required heat is large, a ratio of charging by the wireless charging type occupied in the charging plan as compared with the ratio when the amount of required heat is small.

According to the configuration, when the amount of required heat which is the amount of heat required by the movable body is large, the ratio of charging by the wireless charging type occupied in the charging plan is increased as compared with the ratio when the amount of required heat is small. With increase in ratio of charging by the wireless charging type occupied in the charging plan, thermal energy produced by charging increases, and hence the amount of required heat can be obtained. By using thermal energy originating from charging by the wireless charging type as the amount of required heat, energy efficiency can be enhanced.

In one embodiment, the parameter includes an outside air temperature. The information indicates a larger amount of required heat as the outside air temperature is lower.

When the outside air temperature is low, the amount of required heat is larger than the amount of required heat when the outside air temperature is high. According to the configuration, an appropriate amount of required heat can be calculated in accordance with the outside air temperature.

In one embodiment, the wireless charging type includes a first wireless charging type performed indoors and a second wireless charging type performed outdoors. An indoor temperature is lower than the outside air temperature. When the outside air temperature is high, the controller increases the ratio of the first wireless charging type occupied in charging by the wireless charging type as compared with the ratio when the outside air temperature is low.

When the battery is charged while the outside air temperature is high, the amount of heat more than necessary may be obtained and the temperature of the subject device may increase more than necessary. According to the configuration, when the outside air temperature is high, the ratio of indoor wireless charging is increased as compared with the ratio when the outside air temperature is low. Therefore, the amount of heat more than necessary obtained in charging by the wireless charging type can be suppressed.

In one embodiment, the parameter further includes a temperature of the subject device. The controller obtains the outside air temperature and the temperature of the subject device and calculates the amount of required heat by collating the outside air temperature and the temperature of the subject device with the information.

The amount of required heat is, for example, the amount of heat required for causing the temperature of the subject device mounted on the movable body to attain to the target temperature. According to the configuration, the amount of required heat is calculated with the outside air temperature and the temperature of the subject device being defined as parameters, and hence the amount of required heat can accurately be calculated.

In one embodiment, the subject device includes at least the battery.

In one embodiment, the controller prepares a plurality of charging plans, and adopts as a recommended plan, a charging plan that best satisfies a condition set in advance among the plurality of charging plans.

In one embodiment, a condition concerning an amount of stored power in the battery at the time of arrival at the destination, a condition concerning a time period required for travel from the current location to the destination, or a condition concerning a travel distance from the current location to the destination is included.

According to the configuration, since the charging plan that best satisfies the condition set in advance among the plurality of charging plans is adopted as the recommended plan, a user of the movable body can readily recognize the charging plan suitable for the condition. Therefore, convenience of the user can be improved.

A plan preparation apparatus according to another aspect of the present disclosure prepares a charging plan of a movable body in which a battery is chargeable by a plurality of charging types. The plurality of charging types include a wireless charging type. The plan preparation apparatus includes an information obtaining unit that obtains an outside air temperature and a plan preparation unit that prepares the charging plan from a current location to a destination of the movable body. When the outside air temperature is high, the plan preparation unit increases a ratio of charging by the wireless charging type occupied in the charging plan as compared with the ratio when the outside air temperature is low.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

An embodiment of the present disclosure will be described in detail below with reference to the drawings. The same or corresponding elements in the drawings have the same reference characters allotted and description thereof will not be repeated.

First Embodiment

<System Configuration>

Figure 1:
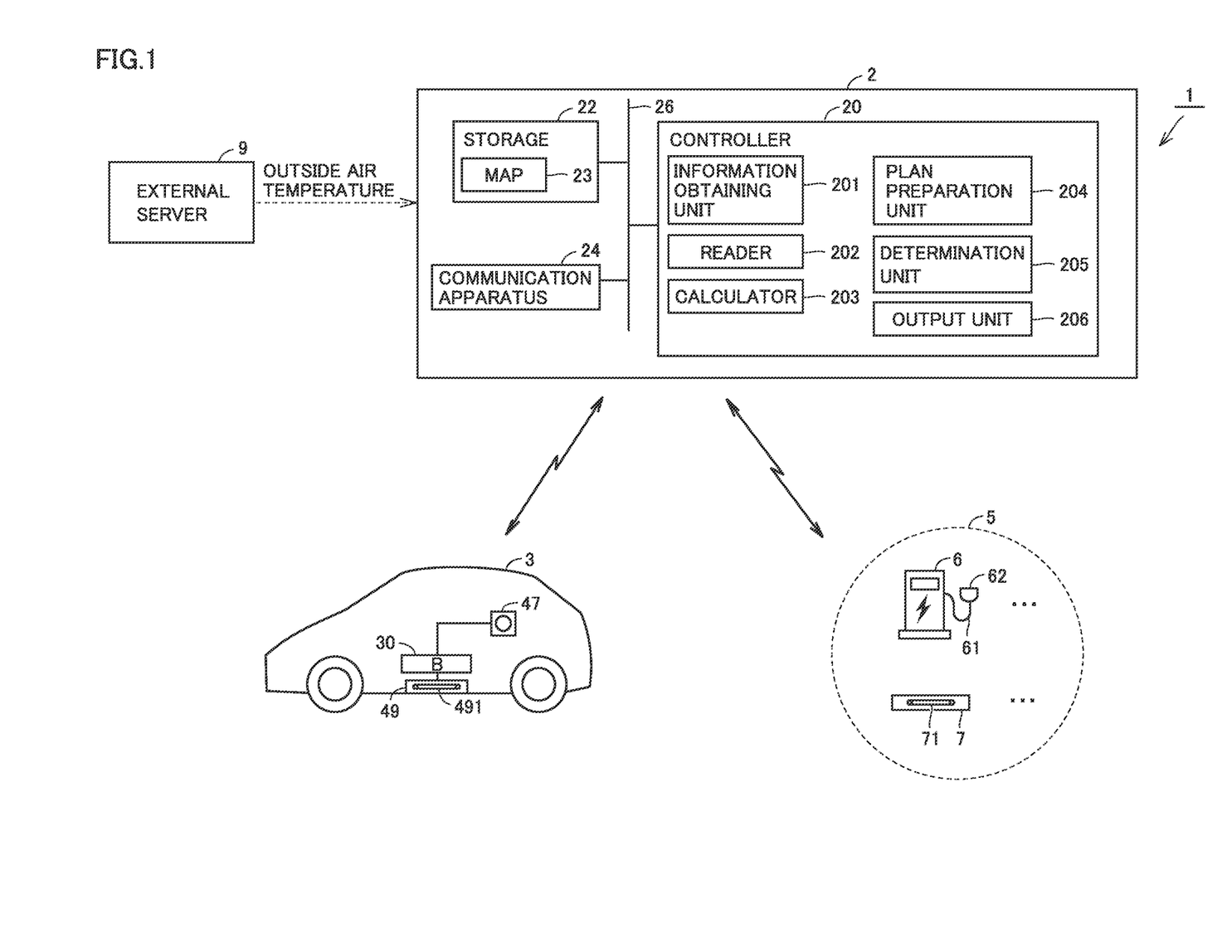
FIG. 1 is a diagram schematically showing a configuration of a charging management system according to a first embodiment.

FIG. 1 is a diagram schematically showing a configuration of a charging management system 1 according to a first embodiment. Charging management system 1 includes a server 2, a vehicle 3, a charging facility group 5, and an external server 9. Charging management system 1 is a system that prepares a charging plan of vehicle 3 (a battery 30). Vehicle 3 is a battery electric vehicle including battery 30 as a motive power source. Server 2 manages vehicle 3, and prepares a charging plan of vehicle 3 with the use of information received from vehicle 3 and external server 9. Though charging management system 1 according to the first embodiment includes a single vehicle, charging management system 1 may include a plurality of vehicles.

Charging facility group 5 includes a plurality of direct-current (DC) charging facilities 6 and a plurality of power transmission apparatuses 7. Any number of DC charging facilities 6 and any number of power transmission apparatuses 7 may be included in charging facility group 5. Vehicle 3 is configured to be adapted to both of charging of battery 30 with DC power supplied from DC charging facility 6 (which is also referred to as "DC charging" below) and charging of battery 30 with electric power wirelessly transmitted from power transmission apparatus 7 (which is also referred to as "wireless charging" below). DC charging and alternating-current (AC) charging which will be described later may also be referred to as "contact charging." Details of the configuration of vehicle 3 will be described later with reference to FIG. 2.

DC charging facility 6 is a contact-type charging facility that supplies DC power. DC charging facility 6 includes a charging cable 61 and a charging connector 62. In DC charging, charging connector 62 is connected to an inlet 47 of vehicle 3.

Power transmission apparatus 7 includes a power transmission coil 71. Vehicle 3 includes a power reception apparatus 49 including a power reception coil 491, and it wirelessly receives electric power from power transmission coil 71 while it is located above power transmission apparatus 7. Wireless charging in the first embodiment includes "wireless charging while traveling" and "wireless charging in standstill."

In order to carry out wireless charging while traveling, a "first power transmission apparatus" includes at least one power transmission apparatus 7. The first power transmission apparatus is provided under the ground in a travel lane along which vehicle 3 can travel. Power transmission apparatuses 7 included in the first power transmission apparatus are arranged, for example, in line along a direction of travel of vehicle 3 in the travel lane. Power transmission apparatus 7 wirelessly supplies electric power to vehicle 3 that travels along the travel lane where power transmission apparatus 7 is provided. A portion of the travel lane where the first power transmission apparatus is provided is also referred to as a "power feed lane" below. In preparation of a charging plan which will be described later, the first power transmission apparatus is understood as one charging facility for carrying out wireless charging while traveling.

In order to carry out wireless charging in standstill, power transmission apparatus 7 is placed indoors and outdoors. Power transmission apparatus 7 is placed, for example, on the ground in an indoor parking lot of a facility or placed on the ground in an outdoor parking lot. A user of vehicle 3 aligns vehicle 3 such that power reception apparatus 49 (power reception coil 491) is opposed to power transmission apparatus 7 (power transmission coil 71). While alignment is maintained, power transmission coil 71 of power transmission apparatus 7 wirelessly transmits electric power through magnetic field to power reception coil 491 of power reception apparatus 49. Power transmission apparatus 7 for carrying out wireless charging in standstill is also referred to as a "second power transmission apparatus" below.

Outside air temperatures of all parts of the country for each time slot are stored in external server 9. An actually measured value or a predicted value of the outside air temperatures may be stored in external server 9. External server 9 provides information indicating the outside air temperature to server 2 as requested by server 2.

Server 2 includes a controller 20, a storage 22, and a communication apparatus 24. Controller 20, storage 22, and communication apparatus 24 are connected to one another through a communication bus 26.

Controller 20 is implemented, for example, by an integrated circuit including a central processing unit (CPU). Controller 20 is configured to perform prescribed computing processing described in a program stored in storage 22.

Storage 22 includes a read only memory (ROM) and a random access memory (RAM). A program to be executed by controller 20 is stored in the ROM. Data generated by execution of a program by controller 20 and data entered through communication apparatus 24 are temporarily stored in the RAM. The RAM functions also as a temporary data memory used as a work area. Map information and vehicle information which will be described later are stored in storage 22.

The map information includes information on a node indicating an intersection or a dead end, a link defined by connecting nodes to each other, and a facility (a building or a parking lot) located along the link. The map information includes information on specifications (for example, the charging type and charging capability) of each of a plurality of DC charging facilities 6 and each of a plurality of power transmission apparatuses 7 and on a placement location. A road may newly be constructed, a geometry of the road may be changed, a charging facility may be placed, or a charging facility may be replaced. Therefore, the map information is periodically updated to a latest state, for example, by a manager of server 2.

Communication apparatus 24 is configured to bidirectionally communicate with an external device. The external device includes, for example, a communication apparatus 41 (FIG. 2) of vehicle 3, each of the plurality of DC charging facilities 6, and each of the plurality of power transmission apparatuses 7. Communication apparatus 24 and the external device communicate, for example, wirelessly with each other.

Controller 20 collects position information (GPS information) and state of charge (SOC) information from vehicle 3 through communication apparatus 24. Such information may periodically be transmitted, for example, from vehicle 3 to server 2. Controller 20 has the collected information (position information and SOC information) stored in storage 22 as "vehicle information" in association with a vehicle ID. The information on the vehicle ID is information for uniquely identifying vehicle 3 and it may be a vehicle identification number (VIN). The vehicle information further includes also information on a type, a model year, a model, specifications (including specifications of battery 30), and a state (for example, a state of deterioration and a full charge capacity of the battery) of vehicle 3.

A map 23 is further stored in storage 22. Map 23 is information for calculating an amount of heat required by vehicle 3. Performance of each device of vehicle 3 lowers when the temperature is low. Therefore, a target temperature for suppressing lowering in performance is set for a specific device (which is also referred to as a "subject device" below) among devices of vehicle 3. The amount of heat required by vehicle 3 refers to an amount of heat (which is also referred to as an "amount of required heat" below) Q required to increase the temperature of the subject device to a target temperature. Map 23 is information that defines relation among an outside air temperature TO, a temperature of the subject device, and amount of required heat Q. Map 23 is determined in advance based on specifications of vehicle 3, experiments, or a result of simulation, and stored in storage 22. Map 23 shows, for example, such relation that amount of required heat Q is smaller as outside air temperature TO is higher.

In the first embodiment, battery 30 is assumed as the subject device, and an example in which amount of required heat Q is the amount of heat required for increasing the temperature of battery 30 (a battery temperature TB) to a target temperature Ttag will be described. The subject device may include a PCU 36 (FIG. 2) of vehicle 3, a motor generator 37 (FIG. 2) of the vehicle, and an air conditioner 50 (FIG. 2) of the vehicle.

In coordination with a navigation system 42 (FIG. 2) of vehicle 3, controller 20 searches for a route (travel route) to a destination entered into navigation system 42 by a user of vehicle 3 and prepares a charging plan for each result of search (which may include a plurality of travel routes). Specifically, initially, controller 20 calculates amount of required heat Q which is the amount of heat required for increasing the temperature of battery 30 to target temperature Ttag. Controller 20 obtains battery temperature TB from vehicle 3 and obtains outside air temperature TO from external server 9. Controller 20 calculates amount of required heat Q by reading map 23 from storage 22 and collating battery temperature TB and outside air temperature TO with map 23.

Controller 20 prepares a charging plan with which amount of required heat Q will be obtained, for each of the plurality of travel routes. A plurality of charging plans may also be prepared for one certain travel route. Controller 20 transmits the plurality of prepared charging plans to vehicle 3 through communication apparatus 24 and requests the user of vehicle 3 to make selection. Details of preparation or the charging plan will be described later with reference to FIG. 3

Figure 2:
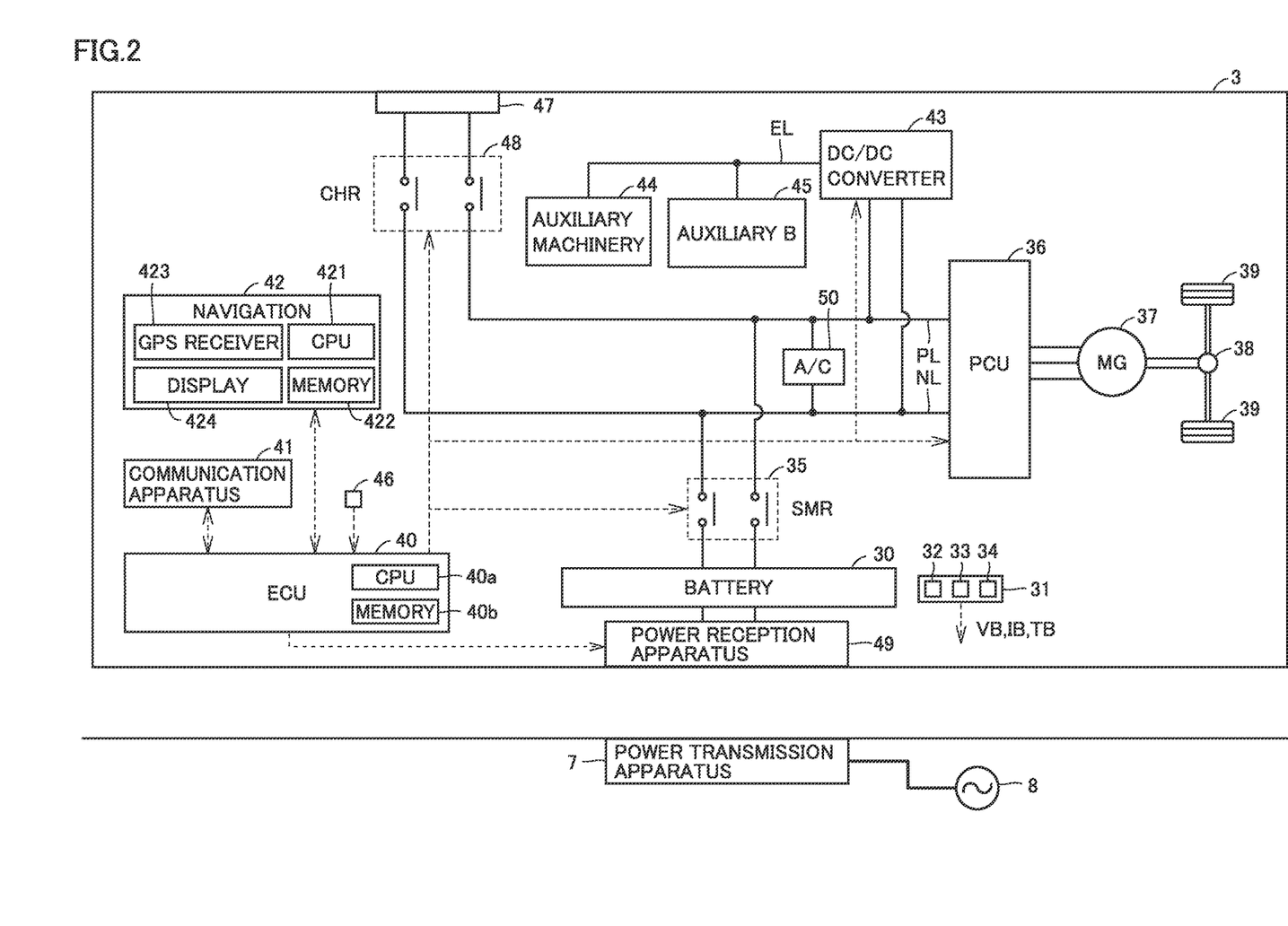
FIG. 2 is a diagram schematically showing a configuration of a vehicle.

FIG. 2 is a diagram schematically showing a configuration of vehicle 3. Vehicle 3 is a battery electric vehicle. Vehicle 3 may be a passenger vehicle or a commercial vehicle. Vehicle 3 may be a vehicle configured to switch between manual drive and autonomous drive, a vehicle configured to be adapted only to autonomous drive, or a vehicle configured to be adapted only to manual drive. Vehicle 3 corresponds to an exemplary "movable body" according to the present disclosure.

Referring to FIGS. 1 and 2, vehicle 3 includes battery 30, a monitoring unit 31, a system main relay (which is also referred to as an "SMR" below) 35, a power control unit (which is also referred to as a "PCU" below) 36, motor generator 37, a transmission gear 38, a drive wheel 39, an electronic control unit (ECU) 40, a communication apparatus 41, navigation system 42, a DC/DC converter 43, auxiliary machinery 44, an auxiliary battery 45, a temperature sensor 46, and an air conditioner 50.

Battery 30 is mounted as a drive power supply (that is, a motive power source) of vehicle 3. Battery 30 includes a plurality of stacked cells. The cell may be a secondary battery such as a nickel metal hydride battery and a lithium ion battery. The cell may be a cell containing a liquid electrolyte between a positive electrode and a negative electrode or a cell containing a solid electrolyte (all-solid battery).

Monitoring unit 31 monitors a state of battery 30. Monitoring unit 31 includes a voltage sensor 32, a current sensor 33, and a temperature sensor 34. Voltage sensor 32 detects a voltage VB of battery 30 (battery voltage) and provides a signal indicating a result of detection to ECU 40. Current sensor 33 detects an input and output current IB to and from battery 30 (battery current) and provides a signal indicating a result of detection to ECU 40. Temperature sensor 34 detects a temperature TB of battery 30 (battery temperature) and provides a signal indicating a result of detection to ECU 40.

SMR 35 is electrically connected to power lines PL and NL through which PCU 36 and battery 30 are connected to each other. When SMR 35 is closed, electric power is supplied from battery 30 to PCU 36. When SMR 35 is open, electric power is not supplied from battery 30 to PCU 36. SMR 35 switches between a closed state and an open state in accordance with a control signal from ECU 40.

PCU 36 converts DC power stored in battery 30 into AC power in accordance with a control signal from ECU 40 and supplies AC power to motor generator 37. PCU 36 converts AC power generated by motor generator 37 into DC power and supplies DC power to battery 30. PCU 36 includes, for example, an inverter and a converter that boosts a DC voltage supplied to the inverter to at least an output voltage of battery 30.

Motor generator 37 is, for example, a three-phase AC synchronous motor having a permanent magnet embedded in a rotor. Motor generator 37 generates rotational driving force by being driven by PCU 36. Driving force generated by motor generator 37 is transmitted to drive wheel 39 through transmission gear 38.

DC/DC converter 43 is electrically connected between power lines PL and NL and a low-voltage line EL. DC/DC converter 43 lowers a voltage between power lines PL and NL to supply a resultant voltage to low-voltage line EL. DC/DC converter 43 operates in accordance with a control signal from ECU 40.

Auxiliary machinery 44 and auxiliary battery 45 are electrically connected to low-voltage line EL. ECU 40, communication apparatus 41, and navigation system 42 are also electrically connected to low-voltage line EL.

Communication apparatus 41 is configured to bidirectionally communicate with communication apparatus 24 of server 2. Communication apparatus 41 and communication apparatus 24 communicate, for example, wirelessly with each other. Communication apparatus 41 is configured to bidirectionally communicate with each of the plurality of power transmission apparatuses 7. Communication apparatus 41 communicates with each of the plurality of power transmission apparatuses 7, for example, through short-range communication.

ECU 40 includes a CPU 40a, a memory (a ROM and a RAM) 40b, and an input and output port (not shown) to and from which various signals are provided. ECU 40 receives input of a signal from each sensor and provides output of a control signal to each device, and controls each device. Such control is not limited to processing by software and processing can be performed also by constructing dedicated hardware (electronic circuitry).

ECU 40 is configured to calculate a state of charge (SOC) of battery 30. Various known methods such as a method by integration of current values (Coulomb counting) or a method by estimation of an open circuit voltage (OCV) can be adopted as the method of calculating the SOC.

While ECU 40 is active, ECU 40 transmits position information and SOC information on vehicle 3 to server 2 in prescribed control cycles through communication apparatus 41. The position information transmitted to server 2 is used in server 2 for specifying a position of vehicle 3. The SOC information is used in server 2 for processing for preparation of a charging plan which will be described later.

Navigation system 42 gives guidance of the travel route of vehicle 3. Navigation system 42 includes a CPU 421, a memory 422, a global positioning system (GPS) receiver 423, and a display 424 with a touch panel.

In memory 422, a map information database (DB) is configured. CPU 421 receives latest map information from server 2 and has the map information stored in the map information DB. For example, each time server 2 updates the map information, it transmits new map information to vehicle 3 (navigation system 42).

GPS receiver 423 specifies the position of vehicle 3 based on radio waves from an artificial satellite (not shown). CPU 421 provides the position information (GPS information) of vehicle 3 specified by GPS receiver 423 to ECU 40 every prescribed control cycle.

Display 424 shows various types of information and accepts various operations from a user. More specifically, display 424 shows the current location of vehicle 3 and a position of a charging point in a road map around vehicle 3, as being superimposed on each other. The charging point includes, for example, DC charging facility 6, the first power transmission apparatus (power feed lane), and the second power transmission apparatus. Display 424 accepts various operations such as an operation to enter a destination or an operation to make selection from among presented (shown) charging plans.

When a destination is entered by an operation onto display 424, CPU 421 provides information indicating the destination to ECU 40. ECU 40 transmits the information indicating the destination to server 2 through communication apparatus 41. At this time, ECU 40 may transmit the position information of vehicle 3 to server 2 together with the information indicating the destination. As described above, server 2 searches for a travel route, prepares a charging plan for each travel route, and sends the charging plan back to vehicle 3. A plurality of charging plans may also be prepared for one travel route. CPU 421 has the plurality of charging plans shown on display 424 and has the user select one charging plan from among the plurality of shown charging plans. Selection of the charging plan is also selection of the travel route of vehicle 3. CPU 421 may perform a function to search for a travel route and to present the travel route based on the map information stored in the map information DB, the position information of vehicle 3, and traffic information obtained from a not-shown traffic information reception apparatus.

Auxiliary machinery 44 is activated with electric power supplied from low-voltage line EL. Auxiliary machinery 44 includes, for example, a lighting apparatus, a wiper apparatus, an audio apparatus, a power steering apparatus, a meter panel, and a headlight system.

Auxiliary battery 45 includes, for example, a lead acid battery. A voltage of auxiliary battery 45 is lower than the voltage of battery 30, and it is, for example, around 12 V.

Temperature sensor 46 detects an outside air temperature around vehicle 3 and provides a signal indicating a result of detection to ECU 40.

Air conditioner 50 is electrically connected to power lines PL and NL. Air conditioner 50 includes a compressor (not shown), and activates the compressor in accordance with a control signal from ECU 40 to condition air in a compartment.

Vehicle 3 further includes inlet 47 and a charge relay 48 as features for carrying out DC charging.

Inlet 47 is configured such that charging connector 62 provided at a tip end of charging cable 61 of DC charging facility 6 can be connected thereto. In DC charging, charging connector 62 is connected to inlet 47. As charging connector 62 is inserted into inlet 47, inlet 47 and DC charging facility 6 are electrically connected to each other and power transmission (contact charging) from DC charging facility 6 to vehicle 3 is enabled. Vehicle 3 may be configured to be capable of AC charging to charge battery 30 with AC power supplied from an AC charging facility (not shown) outside the vehicle, instead of or in addition to DC charging.

Charge relay 48 is a relay for electrical connection and disconnection between inlet 47 and battery 30. Charge relay 48 is electrically connected between inlet 47 and battery 30. Charge relay 48 switches between the closed state and the open state in accordance with a control signal from ECU 40.

Vehicle 3 further includes power reception apparatus 49 and a charge relay (not shown) as features for wireless charging. The charge relay is a relay for electrical connection and disconnection between power reception apparatus 49 and battery 30. The charge relay is electrically connected between power reception apparatus 49 and battery 30. The charge relay switches between the closed state and the open state in accordance with a control signal from ECU 40.

Power reception apparatus 49 is arranged, for example, on a lower surface of a floor panel of vehicle 3. Power reception apparatus 49 includes power reception coil 491. Power reception coil 491 wirelessly receives electric power transmitted from power transmission apparatus 7. Power reception apparatus 49 rectifies electric power transmitted from power transmission apparatus 7 and provides rectified electric power to battery 30.

A DC/DC converter (not shown) that converts a voltage of DC power received from power reception apparatus 49 into a voltage for charging of battery 30 may further be provided between power reception apparatus 49 and battery 30.

Power transmission apparatus 7 receives supply of electric power from an AC power supply 8. AC power supply 8 is, for example, a commercial system power supply. Power transmission apparatus 7 includes power transmission coil 71 (FIG. 1). Power transmission apparatus 7 receives supply of AC power from AC power supply 8 and wirelessly transmits electric power to power reception coil 491 of power reception apparatus 49 by forming electromagnetic field around power transmission coil 71.

<Wireless Charging While Traveling>

When ECU 40 of vehicle 3 carries out wireless charging while traveling (requests power feed from the first power transmission apparatus), ECU 40 transmits information on requested power to server 2 together with information on the vehicle ID through communication apparatus 41. The information on requested power indicates electric power that vehicle 3 desires to obtain from the power feed lane. Controller 20 of server 2 obtains the information on the vehicle ID and the information on requested power from vehicle 3 through communication apparatus 24. Controller 20 of server 2 has the information on the vehicle ID and the information on requested power stored in storage 22 in association with each other.

ECU 40 of vehicle 3 transmits the information on the vehicle ID through communication apparatus 41 by short-range communication. By receiving the information on the vehicle ID through short-range communication, power transmission apparatus 7 senses passage shortly after of vehicle 3 thereabove. When power transmission apparatus 7 receives the information on the vehicle ID from vehicle 3 through short-range communication, it transmits the vehicle ID to server 2. Controller 20 of server 2 reads the information on requested power associated with the received vehicle ID from storage 22 and sends the information on requested power to power transmission apparatus 7 together with the information on the vehicle ID. Power transmission apparatus 7 is driven to supply electric power indicated in the information on requested power associated with the vehicle ID. Specifically, when power transmission apparatus 7 receives the information on the vehicle ID from vehicle 3 through short-range communication, it receives supply of AC power from AC power supply 8 and forms electromagnetic field around power transmission coil 71. For example, power transmission apparatus 7 continues this operation until lapse of a prescribed time period since reception of the information on the vehicle ID from vehicle 3 through short-range communication. When vehicle 3 passes over power transmission apparatus 7, electric power is wirelessly transmitted to power reception coil 491 of power reception apparatus 49 of vehicle 3. Power transmission apparatus 7 may be configured to switch between activation and deactivation in accordance with a control signal from server 2. In this case, for example, server 2 may specify power transmission apparatus 7 over which vehicle 3 passes based on the position information of vehicle 3 and provide a control signal (an operation command) to indicate activation to power transmission apparatus 7. In addition, after vehicle 3 passes over power transmission apparatus 7, server 2 may provide a control signal (a deactivation command) indicating deactivation to power transmission apparatus 7. Alternatively, when server 2 senses entry of vehicle 3 into the power feed lane including a plurality of power transmission apparatuses 7, server 2 may activate the plurality of power transmission apparatuses 7 included in the power feed lane altogether until vehicle 3 passes over the power feed lane. Vehicle 3 thus travels along the power feed lane so that battery 30 can be charged.

Alternatively, the information on requested power may be stored in power transmission apparatus 7. For example, when controller 20 of server 2 obtains the information on the vehicle ID and the information on requested power from vehicle 3 through communication apparatus 24, it transmits the information on the vehicle ID and the information on requested power in association with each other to each of the plurality of power transmission apparatuses 7. The information on the vehicle ID and the information on requested power are stored in association with each other in each of the plurality of power transmission apparatuses 7. When power transmission apparatus 7 receives the information on the vehicle ID from vehicle 3 through short-range communication, it receives supply of AC power from AC power supply 8 and forms electromagnetic field around power transmission coil 71. For example, power transmission apparatus 7 continues this operation until lapse of a prescribed time period since reception of the information on the vehicle ID from vehicle 3 through short-range communication.

<Wireless Charging in Standstill>

When ECU 40 of vehicle 3 carries out wireless charging in standstill (requests power feed from the second power transmission apparatus), ECU 40 has power reception coil 491 of power reception apparatus 49 and power transmission coil 71 of power transmission apparatus 7 aligned with each other while it communicates by short-range communication through communication apparatus 41 with power transmission apparatus 7 that carries out charging. When alignment is completed, ECU 40 of vehicle 3 transmits the information on requested power to power transmission apparatus 7 through server 2. Alternatively, ECU 40 of vehicle 3 may directly transmit the information on requested power to power transmission apparatus 7 through short-range communication without server 2 being interposed. Power transmission apparatus 7 is driven to supply electric power indicated in the information on requested power. Power transmission apparatus 7 continues this operation until it receives a stop request from server 2 or vehicle 3. When a quitting condition is satisfied, ECU 40 of vehicle 3 transmits the stop request to power transmission apparatus 7 through server 2 or directly thereto without server 2 being interposed. For example, a condition that the SOC of battery 30 has reached an SOC set in advance, a condition that a time period set in advance has elapsed, and/or a condition that a user has performed a stop operation may be adopted as the quitting condition.

<Preparation of Charging Plan>

Referring to FIG. 1, controller 20 of server 2 functions as an information obtaining unit 201, a reader 202, a calculator 203, a plan preparation unit 204, a determination unit 205, and an output unit 206 by executing a program stored in storage 22.

Information obtaining unit 201 obtains various types of information from vehicle 3 and external server 9 through communication apparatus 24. Specifically, information obtaining unit 201 obtains SOC information and position information from vehicle 3 in prescribed control cycles. In addition, information obtaining unit 201 obtains information on a destination from vehicle 3. The information on the destination is transmitted from vehicle 3 to server 2 when the destination is entered into navigation system 42 of vehicle 3. When information obtaining unit 201 obtains the information on the destination, it further obtains information indicating battery temperature TB from vehicle 3 and obtains information indicating outside air temperature TO from external server 9. Information obtaining unit 201 provides the information indicating battery temperature TB and the information indicating outside air temperature TO to calculator 203. Information obtaining unit 201 provides the information on the destination, the SOC information, and the position information to plan preparation unit 204.

Furthermore, information obtaining unit 201 obtains from vehicle 3, setting information set in navigation system 42 by the user. The user can select for navigation system 42, an item to be prioritized in giving route guidance, for example, from among "priority on travel distance," "priority on time of arrival," "priority on fees," and "priority on SOC at the time of arrival." Information obtaining unit 201 obtains from vehicle 3, this selected content as the setting information. Information obtaining unit 201 has the obtained setting information stored in storage 22.

Reader 202 reads map 23 from storage 22 and provides read map 23 to calculator 203.

Calculator 203 calculates amount of required heat Q required by vehicle 3. Calculator 203 calculates amount of required heat Q by collating battery temperature TB and outside air temperature TO with map 23. Calculator 203 provides calculated amount of required heat Q to plan preparation unit 204.

Plan preparation unit 204 searches for a travel route from a current location to a destination of vehicle 3 based on the information on the destination and the position information. A result of search may include a plurality of travel routes. Plan preparation unit 204 prepares at least one charging plan with which battery temperature TB can be increased to target temperature Ttag (that is, a charging plan with which amount of required heat Q will be obtained) for the travel route.

Wireless charging has generally been known as being lower in charging efficiency than contact charging (DC charging in the present embodiment). This lowering in charging efficiency results in thermal energy E. When battery temperature TB is lower than target temperature Ttag by a prescribed temperature or more, plan preparation unit 204 increases a ratio of wireless charging in the charging plan and increases the temperature of battery 30 with the use of thermal energy E. Thermal energy resulting from lowering in efficiency in wireless charging increases the temperature, for example, of the lower surface of vehicle 3 and particularly the temperature of power reception apparatus 49. When the temperature of power reception apparatus 49 increases, the temperature of battery 30 arranged near power reception apparatus 49 also increases owing to heat conduction. When the temperature of the lower surface of vehicle 3 increases, the temperature of such subject devices as PCU 36 and motor generator 37 also increases owing to heat conduction. Power reception apparatus 49 is cooled owing to heat conduction to the subject devices and air. Increase in ratio of wireless charging means increase in ratio of an amount of electric power received owing to wireless charging, in an amount of received electric power in the charging plan. In other words, increase in ratio of wireless charging means lowering in ratio of contact charging (DC charging in the first embodiment). Preparation of the charging plan will be described with reference to FIGS. 1 and 3 with the use of specific examples.

Figure 3:
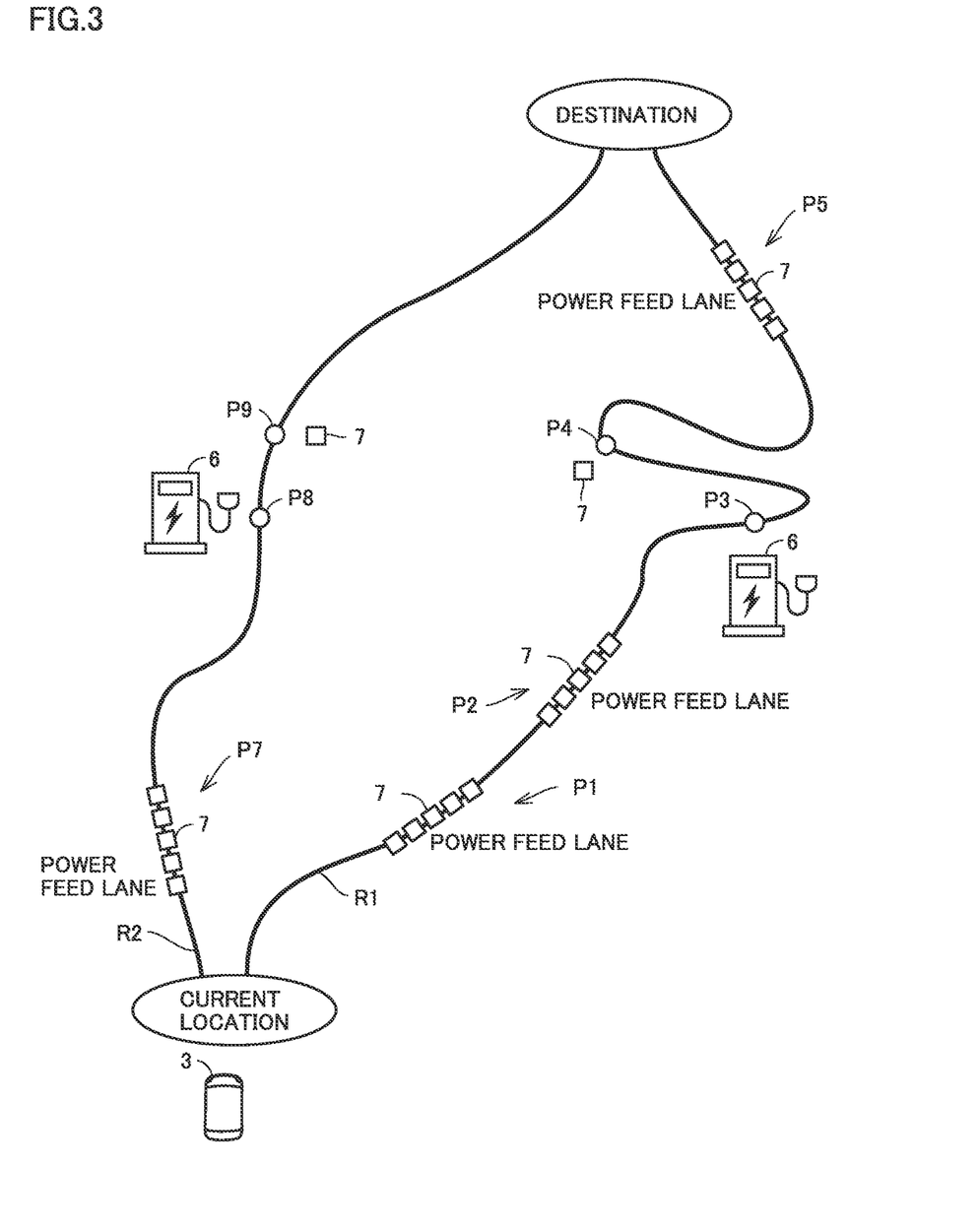
FIG. 3 is a diagram for illustrating preparation of a charging plan.

FIG. 3 is a diagram for illustrating preparation of a charging plan. In an example shown in FIG. 3, two travel routes of a first travel route R1 and a second travel route R2 are found. The example shown in FIG. 3 assumes battery temperature TB as being lower than target temperature Ttag.

First travel route R1 includes five charging points P1 to P5. The power feed lane (first power transmission apparatus) is provided at charging points P1, P2, and P5. DC charging facility 6 is provided at charging point P3. The second power transmission apparatus is provided indoors at charging point P4. Three charging points P7 to P9 are provided along second travel route R2. The power feed lane (first power transmission apparatus) is provided at charging point P7. DC charging facility 6 is provided at charging point P8. The second power transmission apparatus is provided indoors at charging point P9.

Plan preparation unit 204 prepares a charging plan for each of first travel route R1 and second travel route R2 such that (1) the SOC of battery 30 at the time of arrival at the destination attains to a prescribed SOC and (2) a sum of an amount of heat generation by charging of battery 30 at the charging point and an amount of heat generation by charging and discharging of battery 30 with travel of vehicle 3 is equal to amount of required heat Q. The prescribed SOC may be set, for example, to a value set by a user by an operation onto navigation system 42. Alternatively, the prescribed SOC may be set to an SOC value trained by plan preparation unit 204, to be used by vehicle 3 in one trip.

Wireless charging produces a larger amount of thermal energy than DC charging, for lower charging efficiency thereof. Plan preparation unit 201 increases the ratio of wireless charging in the charging plan to obtain amount of required heat Q in consideration also of thermal energy E resulting from lowering in efficiency in wireless charging. Thermal energy E can be calculated based on specifications of the first power transmission apparatus and the second power transmission apparatus or data based on a result of experiments.

An exemplary specific procedure for preparing the charging plan is shown. Initially, in the charging plan for first travel route R1, plan preparation unit 204 provisionally prepares the charging plan, for example, such that the SOC of battery 30 at the time of arrival at the destination attains to a prescribed SOC. Then, plan preparation unit 204 prepares (modifies) the charging plan to increase requested power at charging point P1 for obtaining amount of required heat Q. When a sum AD1 of the amount of heat generation by wireless charging at charging point P1 and the amount of heat generation by charging and discharging of battery 30 while the vehicle travels from the current location to charging point P1 is smaller than amount of required heat Q, plan preparation unit 204 prepares the charging plan to increase requested power at charging point P2. Furthermore, when a sum AD2 of sum AD1, the amount of heat generation by wireless charging at charging point P2, and the amount of heat generation by charging and discharging of battery 30 while the vehicle travels from charging point P1 to charging point P2 is smaller than amount of required heat Q, plan preparation unit 204 prepares the charging plan to increase requested power at charging point P4. When sum AD2 is smaller than amount of required heat Q, plan preparation unit 204 further prepares the charging plan such that requested power at charging point P5 is increased with charging point P5 being prioritized over charging point P4, as a pattern in which priority is placed on movement ahead of time of arrival at the destination. Excess of the SOC of battery 30 at the time of arrival at the destination over the prescribed SOC may be adjusted by reducing an amount of charging power in DC charging.

Plan preparation unit 204 thus prepares the charging plan such that the temperature of battery 30 will have increased to target temperature Ttag by the time of arrival at the destination at least by travel along first travel route R1. Furthermore, plan preparation unit 204 increases requested power sequentially from a charging point (the first power transmission apparatus or the second power transmission apparatus) for wireless charging closer to the current location, in order to increase the temperature of battery 30 to target temperature Ttag early during travel along first travel route R1. The temperature of battery 30 is thus increased early and vehicle 3 can travel with performance of battery 30 having been improved.

In a charging plan also for second travel route R2, plan preparation unit 204 provisionally prepares the charging plan initially such that the SOC of battery 30 at the time of arrival at the destination attains to the prescribed SOC. Then, plan preparation unit 204 prepares (modifies) the charging plan to increase requested power at charging point P7 for obtaining amount of required heat Q. When a sum AD7 of the amount of heat generation by wireless charging at charging point P7 and the amount of heat generation by charging and discharging of battery 30 while the vehicle travels from the current location to charging point P7 is smaller than amount of required heat Q, plan preparation unit 204 prepares the charging plan to increase requested power at charging point P9.

Preparation of the charging plan to increase the ratio of wireless charging as above can achieve more increase in temperature of battery 30, together with charging of battery 30, than preparation of the charging plan without increasing the ratio of wireless charging, so that battery temperature TB can reach target temperature Ttag.

Referring again to FIG. 1, determination unit 205 determines one charging plan (which is also referred to as a "recommended plan" below) to be recommended to a user of vehicle 3 among prepared charging plans. Determination unit 205 reads setting information set in navigation system 42 by the user of vehicle 3 from storage 22. For example, when the setting information indicates "priority on time of arrival," determination unit 205 adopts as the recommended plan, a charging plan earliest in time of arrival at the destination among prepared charging plans. When the setting information indicates "priority on SOC at the time of arrival," determination unit 205 adopts as the recommended plan, a charging plan with which the SOC of battery 30 at the time of arrival at the destination will be closest to (match with) the prescribed SOC among prepared charging plans. At this time, determination unit 205 may determine the recommended plan among the charging plans with which delay in arrival at the destination, as compared with the charging plan earliest in time of arrival at the destination, is within a prescribed time period.

Output unit 206 transmits to vehicle 3 through communication apparatus 24, the prepared charging plan and information indicating which of prepared charging plans has been adopted as the recommended plan.

When ECU 40 of vehicle 3 obtains the charging plan through communication apparatus 41, ECU 40 provides the charging plan to navigation system 42. CPU 421 of navigation system 42 has the recommended plan shown on display 424 in a manner recognizable by a user (change of color for representation or highlighted representation) and has the user select any charging plan. As the recommended plan is shown, the user can readily recognize the charging plan suitable for contents (setting information) set by the user himself/herself. Therefore, convenience of the user can be improved.

<Processing Performed in Server and Vehicle>

Figure 4:
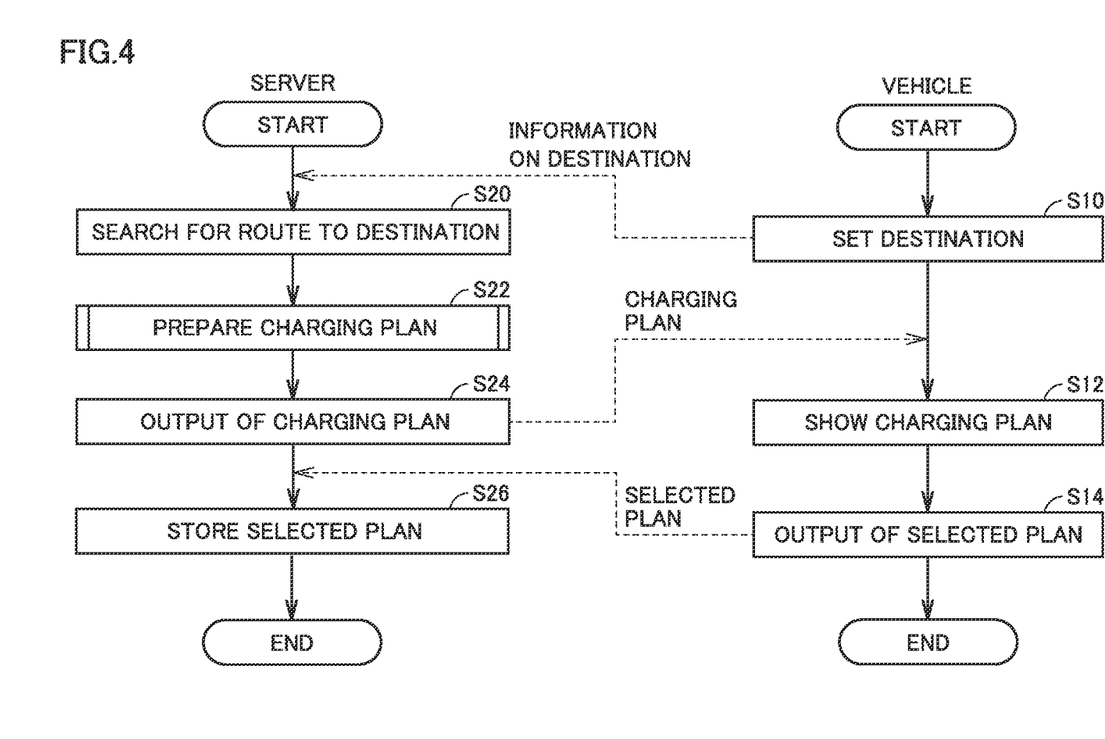
FIG. 4 is a flowchart showing a procedure in processing for setting a charging plan.

FIG. 4 is a flowchart showing a procedure in processing for setting a charging plan. Processing in this flowchart is started by ECU 40 of vehicle 3, CPU 421 of navigation system 42, and controller 20 of server 2 when the destination is set. Though an example in which each step (the step being abbreviated as "S" below) in the flowchart in FIG. 4 is performed by software processing by controller 20, ECU 40, and CPU 421 will be described, a part or the entirety thereof may be performed by hardware (electric circuitry) made in controller 20, ECU 40, and/or CPU 421.

In S10, the destination is set by an input operation onto display 424 of navigation system 42. When ECU 40 obtains the destination from navigation system 42, it provides information on the destination to server 2.

In S20, controller 20 searches for a travel route from the current location to the destination of vehicle 3 based on the information on the destination and information on the current position and the SOC information of vehicle 3.

Figure 5:
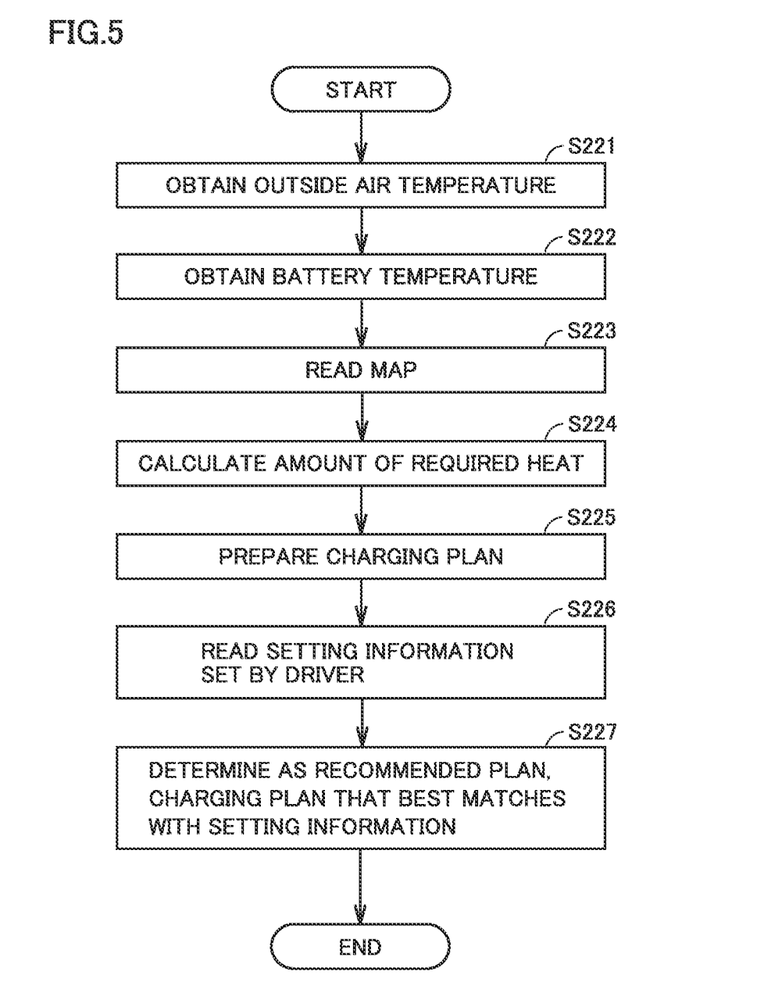
FIG. 5 is a flowchart showing a procedure in processing for preparing a charging plan.

In S22, controller 20 prepares at least one charging plan for the travel route. FIG. 5 is a flowchart showing a procedure in processing for preparing a charging plan.

In S221, controller 20 obtains outside air temperature TO from external server 9 through communication apparatus 24. For example, when the current location and the destination of vehicle 3 are located within an identical area, controller 20 obtains outside air temperature TO of that area from external server 9. When the current location and the destination of vehicle 3 are located in areas different from each other, controller 20 may obtain, for example, outside air temperatures of the area including the current location, the area including the destination, and areas present between the current location and the destination from external server 9 and adopt an average value thereof as outside air temperature TO. Controller 20 can also adopt a temperature obtained by temperature sensor 46 of vehicle 3 as the outside air temperature of the area including the current location.

In S222, controller 20 obtains battery temperature TB from vehicle 3 through communication apparatus 24.

In S223, controller 20 reads map 23 from storage 22.

In S224, controller 20 calculates amount of required heat Q required for increasing battery temperature TB to target temperature Ttag by collating outside air temperature TO and battery temperature TB with map 23.

In S225, controller 20 prepares the charging plan. Controller 20 reads the prescribed SOC from storage 22, and prepares the charging plan such that the SOC of battery 30 at the time of arrival at the destination attains to the prescribed SOC and the sum of the amount of heat generation by charging of battery 30 at the charging point and the amount of heat generation by charging and discharging of battery 30 with travel of vehicle 3 is equal to amount of required heat Q. Controller 20 may prepare a plurality of charging plans for one travel route. For example, controller 20 may prepare a charging plan with priority being placed on time of arrival, a charging plan with priority being placed on the SOC at the time of arrival, and the like for one travel route.

In S226, controller 20 reads from storage 22, setting information set in navigation system 42 by the user of vehicle 3.

In S227, controller 20 determines as the recommended plan, the charging plan that best matches with the setting information among the plurality of prepared charging plans. When one charging plan alone has been prepared, controller 20 determines that charging plan as the recommended plan.

Referring again to FIG. 4, in S24, controller 20 transmits the prepared charging plan to vehicle 3.

In S12, ECU 40 provides the charging plan received from server 2 to navigation system 42. CPU 421 of navigation system 42 has the charging plan shown on display 424. The user of vehicle 3 selects one charging plan from among the shown charging plans. The travel route selected by the user is also referred to as a "selected plan" below.

In S14, CPU 421 of navigation system 42 provides the selected plan to ECU 40. Then, ECU 40 provides the selected plan received from navigation system 42 to server 2.

In S26, controller 20 has the selected plan stored. Thereafter, controller 20 provides guidance information in accordance with the selected plan to vehicle 3 in prescribed control cycles. Vehicle 3 starts a trip and heads for the destination in accordance with the guidance information.

As set forth above, in charging management system 1 according to the first embodiment, when the temperature (battery temperature TB) of the subject device (battery 30 in the first embodiment) of vehicle 3 has not reached target temperature Ttag, server 2 calculates amount of heat (amount of required heat) Q required for increasing battery temperature TB to target temperature Ttag. Then, server 2 prepares the charging plan in consideration of thermal energy E resulting from lowering in efficiency in wireless charging such that the SOC of battery 30 at the time of arrival at the destination attains to the prescribed SOC and the sum of the amount of heat generation by charging of battery 30 at the charging point and the amount of heat generation by charging and discharging of battery 30 with travel of vehicle 3 is equal to amount of heat Q. In other words, server 2 increases the ratio of wireless charging in the charging plan for obtaining amount of required heat Q. The amount of heat obtained by wireless charging is larger than the amount of heat obtained by DC charging. Therefore, by increasing the ratio of wireless charging in the charging plan, the temperature of the lower surface of vehicle 3 and particularly the temperature of power reception apparatus 49 are further increased by charging. When the temperature of power reception apparatus 49 is increased, the temperature of battery 30 arranged near power reception apparatus 49 is also increased owing to heat conduction. Since the temperature of battery 30 can thus increase to target temperature Ttag, lowering in performance of battery 30 can be suppressed.

Server 2 determines as the recommended plan, the charging plan that best matches with the setting information set by the user of vehicle 3 among the prepared charging plans. Vehicle 3 has the recommended plan shown on display 424 of navigation system 42 in a manner recognizable by the user. The user selects the charging plan desired by the user himself/herself from among the charging plans shown on display 424. As the recommended plan is shown, the user can readily recognize the charging plan suitable for setting made by the user himself/herself. Therefore, convenience of the user can be improved.

[First Modification]

Outside air temperature TO may vary every moment. When outside air temperature TO varies, in general, variation in temperature indoors is less than variation in temperature outdoors. In other words, indoor wireless charging is less likely to be affected by outside air temperature TO than outdoor wireless charging. In outdoor wireless charging, with outside air temperature TO varying to increase, battery 30 may obtain thermal energy to further increase in temperature. Therefore, when outside air temperature TO varies after the charging plan is prepared, the amount of heat equal to or more than the amount of heat assumed in the charging plan may be obtained and the temperature of battery 30 may be increased more than necessary. In a first modification, when outside air temperature TO is equal to or higher than a reference temperature Tref, in preparation of a charging plan, server 2 sets a ratio of indoor wireless charging to be higher than a ratio of outdoor wireless charging. In other words, in increasing the ratio of wireless charging in the charging plan, the ratio of indoor wireless charging (wireless charging by the second power transmission apparatus) is increased by prioritizing indoor wireless charging over outdoor wireless charging (wireless charging by the first power transmission apparatus). Reference temperature Tref is higher than the temperature of an indoor place where the second power transmission apparatus is placed.

Referring again to FIG. 3, for example, for first travel route R1, server 2 (plan preparation unit 204) provisionally prepares a charging plan such that the SOC of battery 30 at the time of arrival at the destination attains to a prescribed SOC. Then, server 2 prepares (modifies) the charging plan to increase requested power at charging point P4 (indoor wireless charging) for obtaining amount of required heat Q. When a sum AD10 of the amount of heat generation by wireless charging at charging point P4 and the amount of heat generation by charging and discharging of battery 30 while the vehicle travels from the current location to charging point P4 is smaller than amount of required heat Q, server 2 prepares (modifies) the charging plan to increase requested power at charging point P1 (outdoor wireless charging). When the provisionally prepared charging plan has incorporated charging at the charging point (for example, charging point P1) located between the current location and charging point P4, the amount of heat generation by wireless charging at that charging point (for example, charging point P1) is further added to sum AD10.

Furthermore, when a sum AD11 of sum AD10 and the amount of heat generation by wireless charging at charging point P1 is smaller than amount of required heat Q, server 2 prepares the charging plan to increase requested power at charging point P2.

As set forth above, when outside air temperature TO is equal to or higher than reference temperature Tref, the ratio of indoor wireless charging in wireless charging is increased in the charging plan. Thus, obtainment of the amount of heat equal to or more than the amount of heat assumed in the charging plan and resultant increase in temperature of battery 30 more than necessary can be suppressed.

[Second Modification]

In the first embodiment, an example in which vehicle 3 is adapted to DC charging and wireless charging is described. Vehicle 3 may be configured to be adapted to AC charging instead of DC charging. Furthermore, vehicle 3 may be configured to be adapted to AC charging in addition to DC charging and wireless charging.

[Third Modification]

In the first embodiment, an example in which vehicle 3 is a battery electric vehicle is described. Vehicle 3, however, should only be a vehicle adapted to charging with electric power received from the outside of the vehicle and is not limited to the battery electric vehicle. Vehicle 3 may be, for example, a plug-in hybrid electric vehicle or a fuel cell electric vehicle.

[Fourth Modification]

In the first embodiment, an example in which the subject device is battery 30 is described. In a fourth modification, an example in which a subject device is air conditioner 50 will be described. In the fourth modification, though not shown, a pipe through which coolant for air conditioner 50 flows is provided around power reception apparatus 49. In other words, in the fourth modification, power reception apparatus 49 is liquid-cooled by coolant for air conditioner 50.

A battery electric vehicle or a hybrid electric vehicle may not incorporate an engine, or an engine is not constantly operating in such a vehicle. Therefore, how to secure a heat source for air conditioner 50 (in particular, a heating apparatus) may be an issue. In the fourth modification, heat generation in power reception apparatus 49 by wireless charging is used as the heat source for air conditioner 50.

Target temperature Ttag according to the fourth modification is a target temperature of coolant for air conditioner 50 after coolant cools power reception apparatus 49. Amount of required heat Q according to the fourth modification is an amount of heat required for increasing the temperature of coolant after coolant cools power reception apparatus 49 to target temperature Ttag. The temperature of coolant after it cools power reception apparatus 49 is obtained, for example, by a temperature sensor (not shown) configured to detect the temperature of coolant.

Map 23 according to the fourth modification is information that defines relation among outside air temperature TO, the temperature of coolant, and amount of required heat Q.

Controller 20 (plan preparation unit 204) prepares at least one charging plan with which the temperature of coolant after coolant cools power reception apparatus 49 can be increased to target temperature Ttag (that is, a charging plan with which amount of required heat Q will be obtained) for the travel route. This procedure is similar to the procedure of preparation of the charging plan described in the first embodiment with which battery temperature TB can be increased to target temperature Ttag.

According to the fourth modification, the heat source for air conditioner 50 can be secured by using heat generation in power reception apparatus 49 by wireless charging.

Second Embodiment

In the first embodiment, an example in which server 2 prepares the charging plan and determines the recommended plan is described. Vehicle 3, however, may prepare the charging plan and determine the recommended plan. In a second embodiment, an example in which vehicle 3 prepares the charging plan and determines the recommended plan will be described.

In the second embodiment, when the user of vehicle 3 enters a destination into navigation system 42, CPU 421 of navigation system 42 searches for a route (travel route) from the current location to the destination of vehicle 3 and provides a result of search (which may include a plurality of travel routes) to ECU 40. ECU 40 prepares a charging plan and determines the recommended plan for the travel route with an approach similar to that of server 2 according to the first embodiment. Then, ECU 40 provides the charging plan to navigation system 42.

CPU 421 of navigation system 42 has the charging plan received from ECU 40 shown on display 424 and has the user make selection. When the user selects a charging plan, the selected charging plan (selected plan) is provided to ECU 40. CPU 421 starts guidance with navigation system 42 in accordance with the selected plan.

ECU 40 provides the selected plan received from CPU 421 to server 2. Server 2 thus recognizes an intended travel route of vehicle 3.

Figure 6:
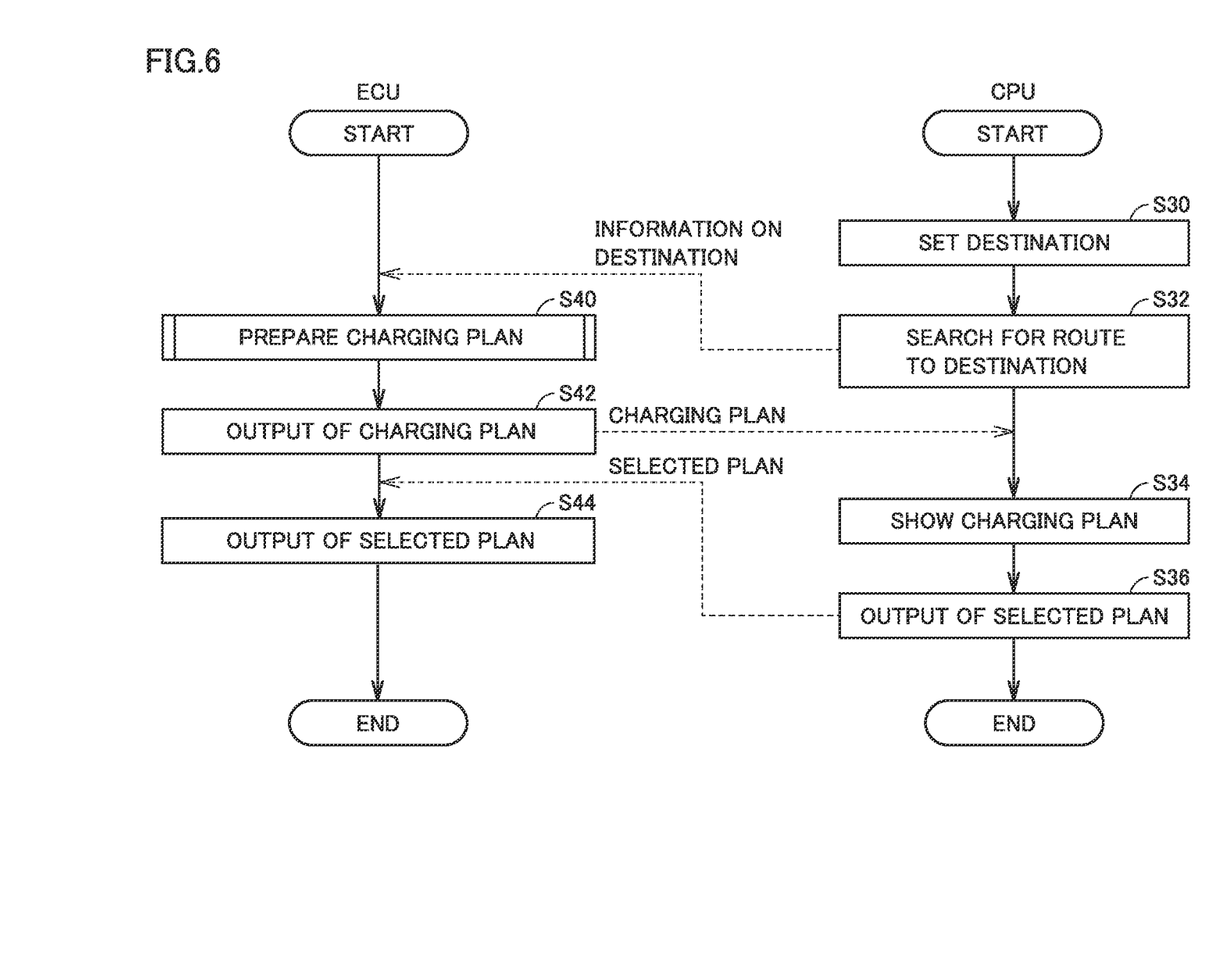
FIG. 6 is a flowchart showing a procedure in processing for setting a charging plan in a second embodiment.

FIG. 6 is a flowchart showing a procedure in processing for setting a charging plan in the second embodiment.

In S30, CPU 421 of navigation system 42 accepts an operation to enter a destination onto display 424 and sets the destination.

In S32, CPU 421 searches for a travel route from the current location to the destination of vehicle 3 based on information on the set destination and information on the current position of vehicle 3. Then, CPU 421 provides the found travel route to ECU 40.

In S40, ECU 40 prepares a charging plan for the travel route. Since processing for preparing the charging plan is similar to the processing in FIG. 5, description will not be repeated.

In S42, ECU 40 provides the prepared charging plan to navigation system 42.

In S34, CPU 421 has the charging plan shown on display 424. The user of vehicle 3 selects one charging plan from among the shown charging plans. Selection of the charging plan also means selection of the travel route of vehicle 3.

In S36, CPU 421 provides the selected charging plan (selected plan) to ECU 40.

In S44, ECU 40 transmits the selected plan received from navigation system 42 to server 2.

The function to prepare the charging plan and to determine the recommended plan can also be performed by CPU 421 of navigation system 42.

As set forth above, an effect as in the first embodiment can be achieved also in such a configuration that vehicle 3 prepares the charging plan and determines the recommended plan.

Though embodiments of the present disclosure have been described, it should be understood that the embodiments disclosed herein are illustrative and non-restrictive in every respect. The scope of the present disclosure is defined by the terms of the claims and is intended to include any modifications within the scope and meaning equivalent to the terms of the claims.

What is claimed is:

1. A plan preparation system that prepares a charging plan of a movable body in which a battery is chargeable by a plurality of charging types, the plurality of charging types including a wireless charging type, the movable body incorporating a subject device, a target temperature of which has been determined, the plan preparation system comprising:
a storage in which information is stored, the information defining relation between a parameter and an amount of required heat which is an amount of heat required for increasing a temperature of the subject device to the target temperature; and
a controller that prepares the charging plan from a current location to a destination of the movable body, wherein the controller
obtains the parameter, calculates the amount of required heat by collating the obtained parameter with the information, and increases, when the amount of required heat is large, a proportion of charging by the wireless charging type occupied in the charging plan as compared with the proportion when the amount of required heat is small.

2. The plan preparation system according to claim 1, wherein the parameter includes an outside air temperature, and the information indicates a larger amount of required heat as the outside air temperature is lower.

3. The plan preparation system according to claim 2, wherein the wireless charging type includes a first wireless charging type performed indoors and a second wireless charging type performed outdoors, an indoor temperature is lower than the outside air temperature, and when the outside air temperature is high, the controller increases the proportion of the first wireless charging type occupied in charging by the wireless charging type as compared with the proportion when the outside air temperature is low.

4. The plan preparation system according to claim 2, wherein the parameter further includes a temperature of the subject device, and the controller obtains the outside air temperature and the temperature of the subject device, and calculates the amount of required heat by collating the outside air temperature and the temperature of the subject device with the information.

5. The plan preparation system according to claim 4, wherein the subject device includes at least the battery.

6. The plan preparation system according to claim 1, wherein the controller prepares a plurality of charging plans, and adopts as a recommended plan, a charging plan that best satisfies a condition set in advance among the plurality of charging plans.

7. The plan preparation system according to claim 6, wherein the condition includes (i) a condition concerning an amount of stored power in the battery at time of arrival at the destination, (ii) a condition concerning a time period required for travel from the current location to the destination, or (iii) a condition concerning a travel distance from the current location to the destination.

8. A plan preparation apparatus that prepares a charging plan of a movable body in which a battery is chargeable by a plurality of charging types, the plurality of charging types including a wireless charging type, the plan preparation apparatus comprising:

an information obtaining unit that obtains an outside air temperature; and a plan preparation unit that prepares the charging plan from a current location to a destination of the movable body, wherein when the outside air temperature is high, the plan preparation unit increases a proportion of charging by the wireless charging type occupied in the charging plan as compared with the proportion when the outside air temperature is low.

* * * * *